United States Patent [19]
Bozzo

[11] Patent Number: 5,782,003
[45] Date of Patent: Jul. 21, 1998

[54] DEVICE FOR PROJECTING A FLAT BEAM OF DIVERGING LASER RAYS

[76] Inventor: Mario Doriguzzi Bozzo, Viale Vicenza, 40, 36071 Arzignano (Vicenza), Italy

[21] Appl. No.: 604,478

[22] Filed: Feb. 21, 1996

[30] Foreign Application Priority Data

Feb. 22, 1995 [IT] Italy ................... MI95A0330

[51] Int. Cl.⁶ ................ G01B 11/26; G01C 15/00
[52] U.S. Cl. ................ 33/291; 33/285; 33/286; 33/293; 33/DIG. 21
[58] Field of Search ............. 33/291, 292, 293, 33/281, 282, 283, 285, 286, 290, DIG. 21

[56] References Cited

U.S. PATENT DOCUMENTS

| | | | |
|---|---|---|---|
| 3,911,588 | 10/1975 | Ohneda | 33/286 |
| 4,106,207 | 8/1978 | Boyett et al. | 33/286 |
| 4,578,870 | 4/1986 | Cooke | 33/288 |
| 4,988,192 | 1/1991 | Knittel | 33/281 |
| 5,485,266 | 1/1996 | Hirando et al. | 33/291 |
| 5,539,990 | 7/1996 | Le | 33/281 |
| 5,552,886 | 9/1996 | Kitajima et al. | 33/291 |
| 5,572,796 | 11/1996 | Breda | 33/283 |

*Primary Examiner*—Christopher W. Fulton
*Attorney, Agent, or Firm*—Bucknam and Archer

[57] ABSTRACT

A device for projecting a flat beam of diverging laser rays comprises a base supporting a movable gravity self-leveling equipment and at least a laser beam or ray projector mounted thereon and provided with an optical lens assembly for transforming the laser beam emitted by the projector into a flat beam of diverging laser rays and laying in a horizontal or vertical plane for projecting at least a straight line laying on a perfectly horizontal or vertical plane.

15 Claims, 9 Drawing Sheets

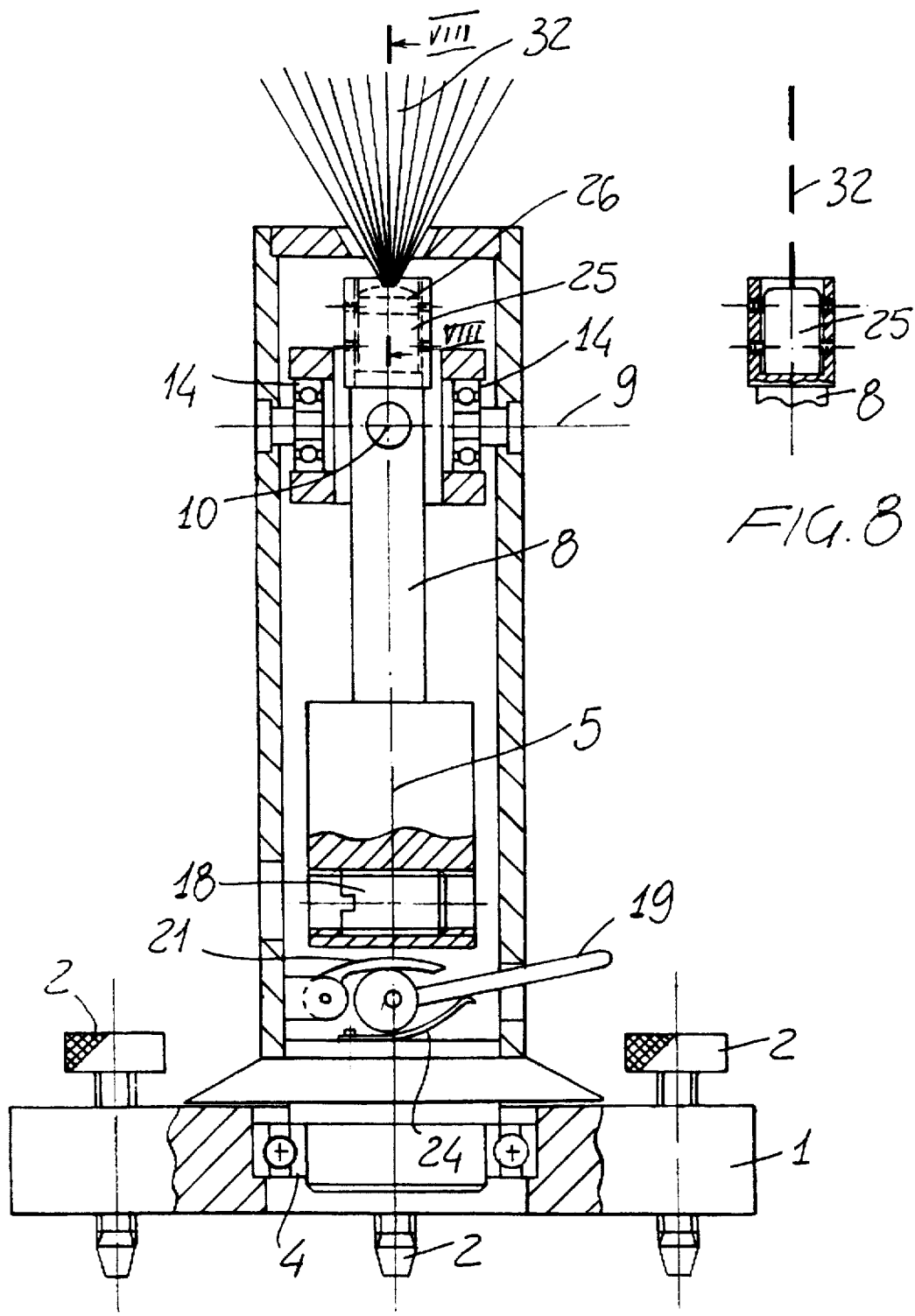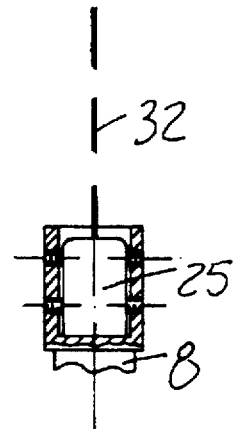
FIG. 8
FIG. 7

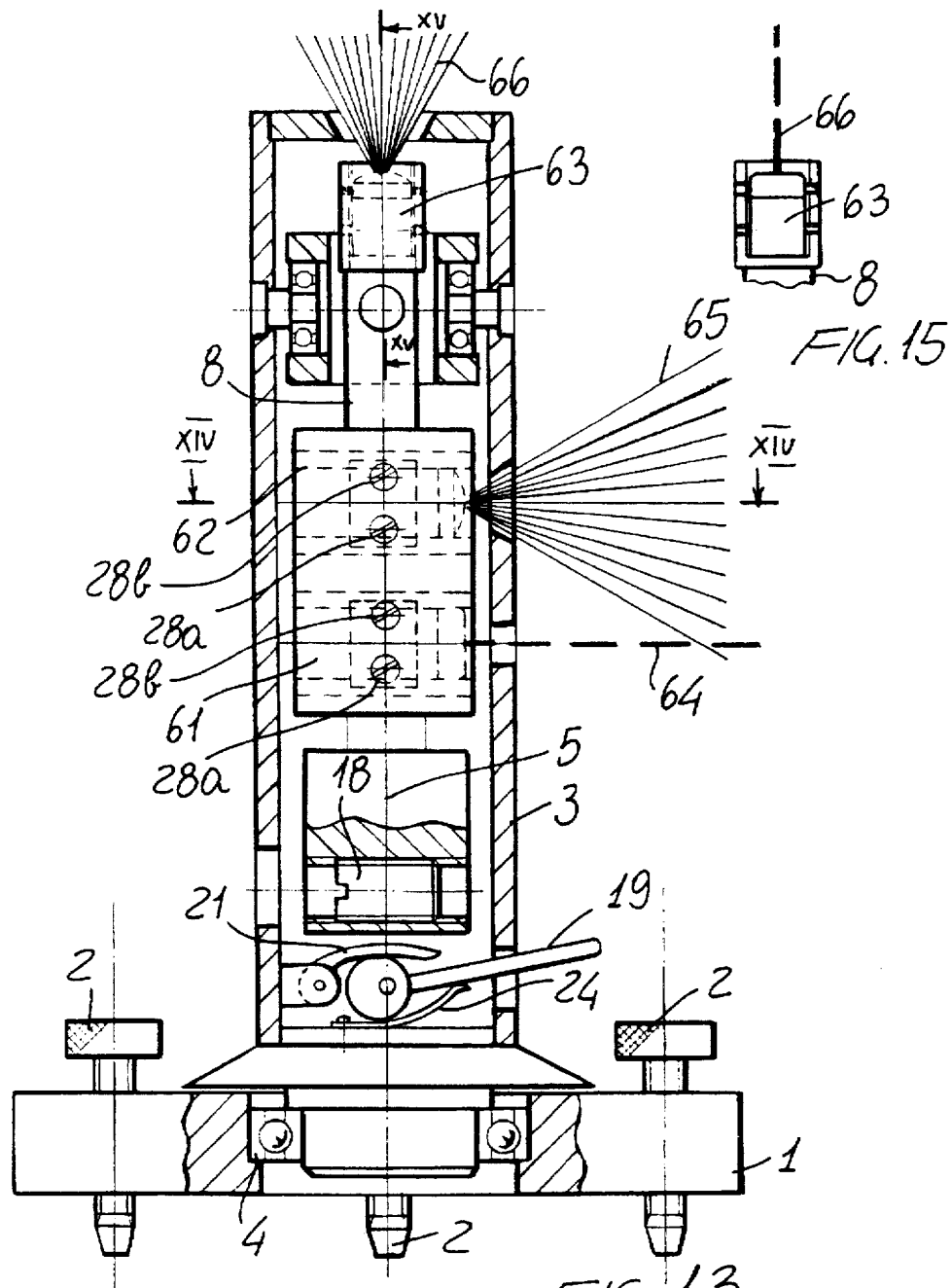
FIG. 15
FIG. 13
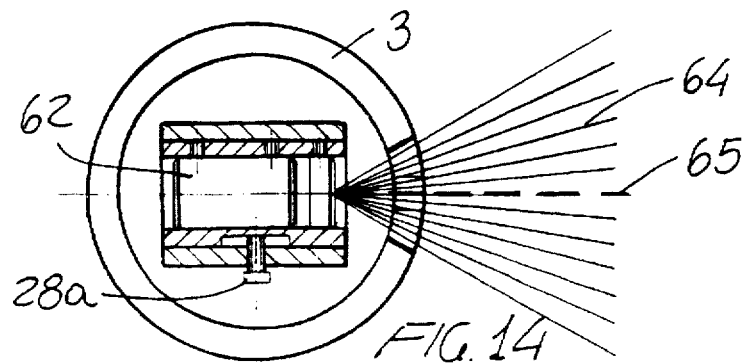
FIG. 14

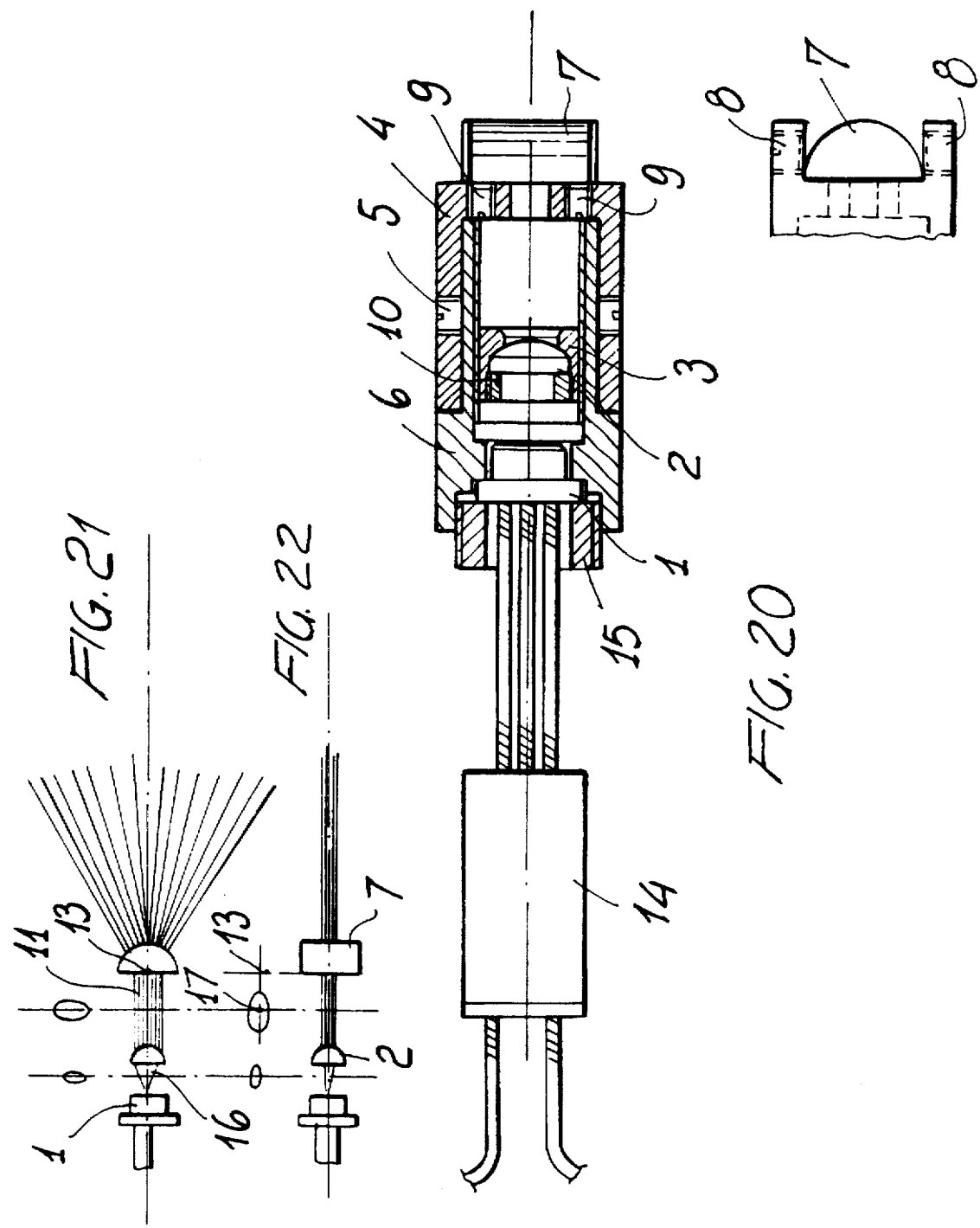

DEVICE FOR PROJECTING A FLAT BEAM OF DIVERGING LASER RAYS

BACKGROUND OF THE INVENTION

The present invention relates to a projector device for projecting one or more diverging laser ray flat beams of a gravity self-leveling type for forming one or more horizontal and/or vertical lines on bodies such as walls or the like.

Devices for projecting laser rays or beams on bodies, such as walls, in which the laser beam projector is mounted on a gravity self-leveling movable equipment, so that the emitted laser beam, under an equilibrium condition of the movable equipment or assembly, is arranged in a perfectly horizontal plane, or along a vertical straight line are already known.

These prior art devices are conventionally designed for projecting, on a wall, a single light point, obtained by the interference of the emitted laser beam, against said wall.

A further class of devices of the above mentioned type, which are at present commercially available, provides for rotating a horizontal ray or beam about a vertical axis, by means of a rotor applied to a prism or penta-prism, which offsets through 90° the vertical laser beam emitted by a laser diode.

However, the latter devices are not of a self-leveling type, since the vertical arrangement of the main beam emitted by the beam generator is obtained by adjusting screws provided for locating the instrument with reference to suitable precision horizontal or vertical vials included therein, or they are self-leveling only within a small fraction of degrees (for example ±5°), and, in the latter devices is always necessary to perform a rather accurate manual pre-leveling operation in order to bring the instrument within the self-leveling action field.

A high speed rotation of the laser beam will involve a generation of a plane through 360° and, accordingly, of a horizontal or vertical straight line by an interference of the mentioned plane with a body such as a wall.

The wavelength of the rotary laser beam can be included either in the visible or in the not visible field: in the latter case, the straight line is defined by a receptor which is sensitive to a variation of the light power impacting thereon, and which is designed so as to signal either in a luminous manner or in an acoustic manner, as the plane generated by the rotary beam is parallel to or coincides with a fixed segment marked on the receptor.

A third class of devices, which are also at present commercially available, provides for projecting a pulsating and not visible vertical laser ray or beam, emitted by a vertically arranged laser diode which, by impinging on a mirror like surface cone suspended under the gravity effect, will diffuse through 360° a plane of not visible laser beams or rays, pulsating and horizontally arranged, which are picked-up by a sensitive receptor of the above mentioned type.

Even in this case, the self-leveling property is limited to a small degree fraction; moreover, the laser beam is not visible and, accordingly, it is always necessary to provide a detecting receptor.

On the other hand, the use of a visible beam, in addition to being of a less immediate exploitation, is frequently less practical, since it, for example, does not allow to perform instantaneous verifications of the leveling arrangement of points not accessible from the operator (this, for example, is the case of a leveling of several points, some of which are arranged beyond a not accessible gate), what, on the contrary, is always possible by using visible beams or rays.

A drawback of this type of devices is the requirement of performing a pre-leveling operation, and the impossibility of simultaneously projecting several laser light planes, so as to provide on the impacted wall one or more perfectly horizontal straight lines, and/or straight lines suitable to be oriented depending on requirements.

At the state of the art, it is not already available an optimum apparatus, i.e. a truly self-leveling device, which does not require any preliminary calibration, and which is suitable to simultaneously project, through the overall 360° range, full planes of visible continuous and nonmovable horizontal and vertical laser beams so as to provide a plurality of optical tracing and/or squaring straight lines, in order to obviate the need of tracing conventional lines by pens or chalks.

The above mentioned prior solutions, of only partially self-leveling devices with horizontal rotary laser beams which, tilted through 90°, provide vertical planes, or of devices, them too partially self-leveling, using not visible laser beams horizontally diffused through 360° by a cone, constitute valid but partial answers to the above mentioned problem.

SUMMARY OF THE INVENTION

The aim of the present invention is to fully solve the above mentioned problem, so as to provide the possibility of projecting, in a very accurate and simple manner, flat beams of visible and continuous sufficiently diverging laser rays (in the range, for example, of 90°–100°), either horizontal or vertical or, simultaneously both, in order to cover a broad sector of the 360° angle, emitted by a truly self-leveling device provided for operating by gravity and not requiring any pre-calibration even on a slanted plane, and which, moreover, is turnable, either manually or automatically, about a vertical axis so as to orient the projected flat beam sector according to any directions.

Such a solution will allow to instantaneously and simultaneously project horizontal and vertical luminous straight lines, having a length which varies according to the distance of the device from the targeted wall.

The laser sources are small power laser diodes, so as to fit the vision safety rules or requirements (class 2 of the European Norm EN 60825, that is: wavelength range 400–700 nm and output power up to 1 mW for CW lasers), in a small size and weight portable instrument.

The device, only for particular applications (for example outdoor and with bright light, or along great distances, where the visible beam tends to become invisible to a human eye even if aided by suitable eye glasses) is provided to use visible pulsating beams or rays (or even not visible beams) which emitted by the laser diode will generate, in an equilibrium condition, flat and pulsating beams of horizontal and/or vertical diverging rays for being intercepted by a receptor apt for detecting the above mentioned type of beams.

Within the scope of the above mentioned aim, a main object of the present invention is to provide such a device which allows to orient through the space, depending on requirements, one or more suitably diverging flat ray beams, in a vertical and/or horizontal plane.

Another object of the present invention is to provide a truly self-leveling device, i.e. a device able of operating without any pre-calibration operation, by simply arranging it on an approximately horizontal surface (for example ±10°) and which can be operated by a single operator, even unskilled, to project perfect horizontal and/or vertical straight lines, independently from the arrangement of the device bearing surface.

The above mentioned aim and objects and further objects, which will become more apparent hereinafter, are achieved by a projector device for projecting one or more diverging laser ray flat beams of a gravity self-leveling type for forming one or more horizontal and/or vertical lines on bodies such as walls or the like, characterized in that said device comprises a construction including a base supporting a movable gravity self-leveling equipment, and at least a laser beam projector mounted on said movable equipment and provided with an optical lens or assembly for transforming the laser beam emitted by said projector into a flat beam of diverging laser rays and laying in a horizontal or vertical plane for projecting at least a straight line laying on a perfectly horizontal or vertical plane.

BRIEF DESCRIPTION OF THE DRAWINGS

Further characteristics and advantages of the projector device according to the present invention, for projecting either one or more diverging laser ray flat beams, will become more apparent hereinafter from the following disclosure of some preferred, though not exclusive, embodiments of said device, illustrated by way of an indicative but not limited example, in the accompanying drawings, where:

FIG. 7 illustrates another embodiment of the device according to the present invention, shown in an analogous manner to that of FIG. 1;

FIG. 8 is a cross sectional view of a detail of the device shown in FIG. 7, taken substantially along the section line VIII—VIII;

FIG. 13 illustrates yet another embodiment of the device according to the present invention, by a partially cross-sectioned elevation view;

FIG. 14 is a further schematic cross-sectional view of the device shown in FIG. 13, and substantially taken along the section line XIV—XIV;

FIG. 15 is a further cross-sectional view of a detail of FIG. 13, substantially taken along the section line XV—XV;

FIG. 20 illustrates an optical laser ray or beam emitting device for emitting laser rays or beams having an even thickness all along the length thereof;

FIGS. 21 and 22 schematically illustrate the ray or beam projecting process.

DESCRIPTION OF THE PREFERRED EMBODIMENTS

Figures 1, 2, 3, 4:
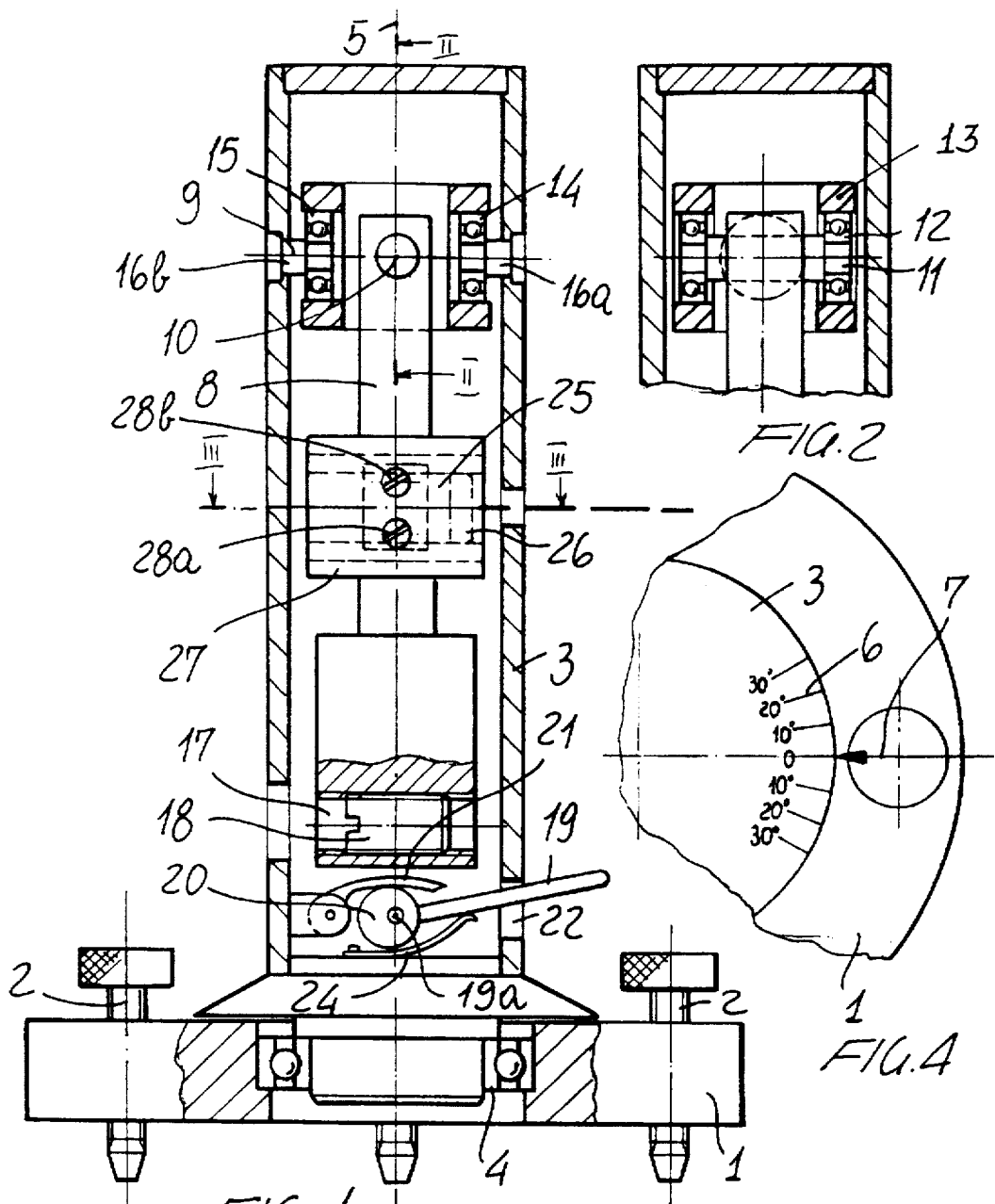
FIG. 1 illustrates a side elevation view, as partially cross-sectioned, of a first embodiment of the device according to the present invention.
FIG. 2 illustrates a cross-sectional view of a detail of FIG. 1, taken substantially along the section line II—II.
FIG. 3 is a schematic cross-section view of FIG. 1, taken along the section line III—III.
FIG. 4 schematically illustrates a detail of the base of the device shown in FIG. 1.

With reference to the reference numbers of the above mentioned figures, the device according to the present invention comprises a supporting construction, including a supporting base, constituted by a base 1 provided with bearing feet 2, which can be constituted by screws engaging with threaded recesses defined in said base 1 and which can be advantageously registered or adjusted in height, so as to allow the device to be suitably arranged on a bearing surface, to project the ray beam at a desired level.

From the base 1 extends a top portion 3 having a substantially tubular construction, and supported by the mentioned base 1, through the interposition of a bearing 4, so as to rotatably turn about a vertical axis 5.

Thus, the top portion 3 can be turned, with respect to said base 1, about the mentioned vertical axis 5, said top portion 3 being moreover provided, near the bottom portion thereof, with a plurality of notches 6 which can be marked by an index 7, or mark, defined on the top face of the base 1, so that the rotation of the top portion 3, about the axis 5, can be carried out in a very accurate and controlled manner.

Inside the top portion 3 it is supported a self-leveling movable equipment 8, which can swing, with respect to said top portion 3, about two horizontal axes 9 and 10, substantially mutually coplanar and perpendicular, and preferably crossing at the axis 5.

More specifically, the movable equipment 8 is mounted on a pin 11, whose axis coincides with the axis 10 which is ratably supported about the mentioned axis, through the interposition of bearings 12, by a small block 13 which, in turn, is supported, through the interposition of bearings 14 and 15, by a pair of pins 16a and 16b affixed to the top portion 3 and having axes which coincide with the axis 9.

The movable equipment 8 is moreover provided, near the bottom end portion thereof, with a threaded recess 17, the axis of which is substantially horizontal, and in which is engaged a dowel which can be displaced by screwing it on or off inside said threaded recess 17. The dowel 18 constitutes a mass whose position, inside the threaded recess 17, allows to change the position of the center of mass of the movable equipment 8.

The device according to the present invention is moreover provided with a damping device for damping the self-leveling swinging movement of the movable equipment 8.

This damping device comprises a lever 19 which is articulated on the top portion 3 about an axis 19a preferably crossing the vertical axis 5.

The lever 19, about said axis 19a, is provided with an eccentric portion 20 suitable to operate, through a smaller lever 21, against the bottom end portion of the movable equipment 8 for cushioning or damping the swinging movement thereof.

As shown, the lever 19 projects from an opening 22 defined through the side surface of the top portion 3, and being held in a rest condition by a small spring 24.

As it is specifically shown in FIG. 1, at least a projector 25 is arranged on the movable equipment 8, said projector 25 is suitable to emit a laser beam or ray and is provided with an optical assembly or lens 26 for transforming the emitted laser beam or ray into a flat beam 30 of diverging laser rays laying on a same horizontal plane.

At present, the emission or projection of a flat beam of diverging laser rays laying in a single plane, for example of the visible type, is obtained by specifically designed optical assemblies which, however, do not provide for a projected perfectly rectilinear line, for example on a wall. Moreover said line does not have an even thickness (of amplitude in the cross direction) for the overall length thereof.

The present invention, owing to specifically designed constructional features, provides on the contrary for a visible laser line devoid of the above mentioned defects, so that the obtained line is laying fully and effectively on a single plane and is having, moreover, an even thickness through the overall length thereof.

With reference, for simplicity, to visible rays, without excluding not visible laser rays, and with reference to FIGS. 20,21 and 22 the device according to the present invention comprises, a laser bearing bushing 206 on which is mounted a cylindrical lens bearing bushing 204 provided with position affixing dowels 205 which supports a half-cylindrical lens 207 set at a proper position by setting dowels 209 and fixed by dowels 208.

The bushing 206 contains the body 203, therein half-spherical lens 202 rigidly held in its position by the ring nut 210 is housed, whereas the laser diode assembly 201, locked by the threaded ring nut 215, is aligned with said body 203.

The laser diode 201 will emit, as it is known, a laser beam having an elliptical cross-section whose rays are not collimated, that is they are not parallel but greatly and progressively diverging as the distance from the source thereof is increased. As these rays must be collimated, they are caused to pass through a suitable half spherical lens whose property is to collect them and making them parallel. In the case in consideration, the laser beam 216 will impact on the hemispherical lens 202 which is arranged at a properly set distance from the laser source, so that said lens collects all the emitted light, whereby the output collimated rays beam fully preserves the elliptical cross section of the laser source.

The collimated beam 211 will successively impact against the half-cylindrical lens 207 which will transform the collimated laser beam 211 into a flat beam.

In order to give the collimated beam an even thickness, the plane of the elliptical cross section collimated laser beam 211, on which lays the minor axis 212 must contain the geometrical axis 213 of the half-cylindrical lens 207. In order to obtain this, the laser bearing bushing 206 is turned in the lens bearing bushing 204 so as to provide the desired alignment, thereupon the assembly is locked in its desired position by means of the screws 205.

The so obtained flat beam will be perfectly rectilinear, i.e. it will lay on a single plane only if the geometrical axis 213 of the half-cylindrical lens 207 is effectively perfectly perpendicular to the central axis 217 of the elliptical cross section of the collimated laser beam 211. This condition is obtained by adjusting the half-cylindrical lens 207 by the screws 209 whereas the screws 208 hold said lens.

The above disclosed adjustment operations will be performed at the factory by means of a suitable equipment and, when properly performed, a visible laser line of even thickness and laying on a same plane can be obtained by projection, for example on a front wall.

The above disclosed device is substantially a novel independent optical assembly which further comprises a control panel 214 for the laser diode 201, supplied by batteries or any other suitable power supply source.

The optical assembly, upon suitable calibration, is usable in any desired position for providing, for example, a visible vertical or horizontal straight line.

The most useful and frequent use is, however, to apply the device to the self-leveling swinging element of a horizontal plane leveling apparatus, preferably of a rotary type.

Such an apparatus is normally used for projecting a single self-leveled horizontal visible laser beam, for example on a wall, therefore it can be seen a bright point, displaceable in several directions by turning the apparatus, while preserving its position on the same horizontal plane.

By using the device of the present invention, after being calibrated it is possible to project, for example on a vertical wall, a visible laser ray line of a comparatively great length and of even thickness entirely positioned on a single horizontal plane.

Thus, the advantage of obtaining a line instead of a single point, which requires a lot of subsequent angular displacements of the point emitting apparatus for localizing several points laying all on the same plane is evident, whereas the line owing to its length will immediately localize a lot of points positioned on the same plane.

Moreover, by turning the apparatus a self-leveled line is always obtained, independently from the projection direction thereof.

An additional application of the device according to the present invention and related to the subject pivot laser, provides its mounting for the projection of the laser line in a perfect vertical orientation under any conditions: thus by turning the subject device it is possible to draw different vertical planes in different directions.

Moreover, it is, also, possible to arrange on the swinging assembly two optical devices in the same apparatus, one over the other and parallel to one another but with axes turned through 90°, so as to provide two diverging ray flat beams perpendicularly crossing one another.

The above disclosed solutions are related to either continuous or pulsating visible or not visible laser rays or beams.

The projector 25 and optical assembly or lens 26 are mounted in a sleeve 29 adjustably supported about the axis thereof which coincides with the emitted laser ray, inside a small block 27.

The adjustment of the position of the projector 25 and related optical assembly or lens 26, is performed by a pair of screws 28a and 28b.

The projector 25 can be constituted, for example, by a laser diode of a sufficient power having a collimated output beam, supplied by batteries arranged in the body 3 or by a rectifier connected to the mains voltage, whereas the beam can be emitted, according to the requirements, either in a continuous or a pulsating way or having a wavelength within the visible, or the not visible radiation range.

Owing to the self-leveling effect of the movable equipment 8, it is not necessary in order to project a diverging ray beam on a perfectly horizontal plane, that the plane on which is arranged the device is a perfectly horizontal plane, but it can also be slanted with an inclination in the range of plus or minus 10°, or greater, the arrangement depending exclusively on the width or size of the inner diameter of the body 3, i.e. on the room available for the movable equipment in order to be set in the equilibrium positions, without touching the inner wall of the body 3.

In order to allow the diverging laser ray flat beam to lay, in condition of equilibrium, on a perfectly horizontal plane, the two adjusting possibilities provided by the dowel 18 and the screws 28a and 28b are applied during the assembly operation.

More specifically, the two screws 28a and 28b, cause the sleeve 29 to turn about its rotary axis so that the generated diverging laser ray flat beam 30 does not cross the horizon or any horizontal reference lines.

The horizontal arrangement of the diverging laser ray flat beam is obtained by sliding the dowel 18, which, by its mass, will cause the movable equipment 8 to obtain the desired position.

Figure 5:
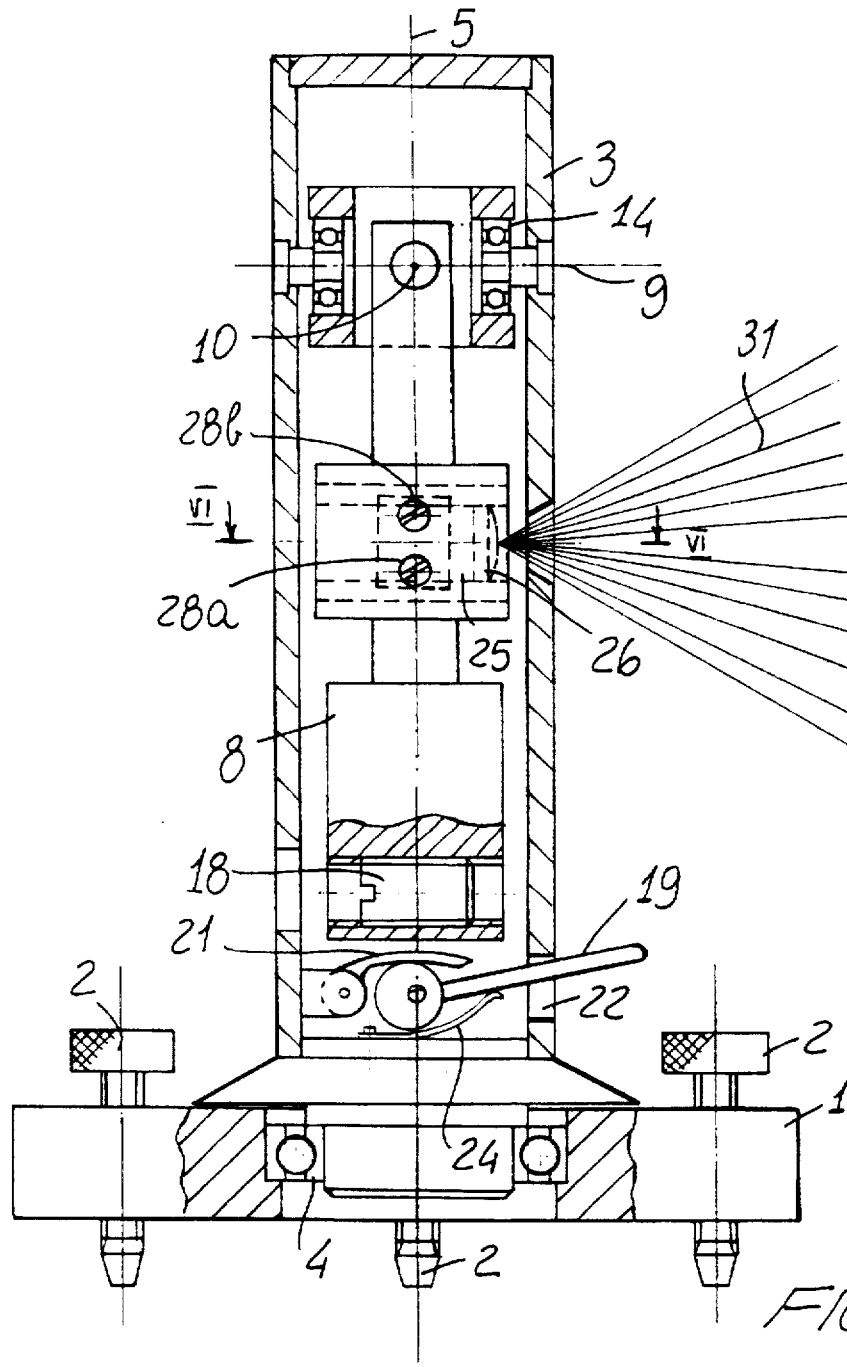
FIG. 5 illustrates a second embodiment of the device according to the present invention, which is shown in an analogous manner to the device of FIG. 1.
Figure 6:
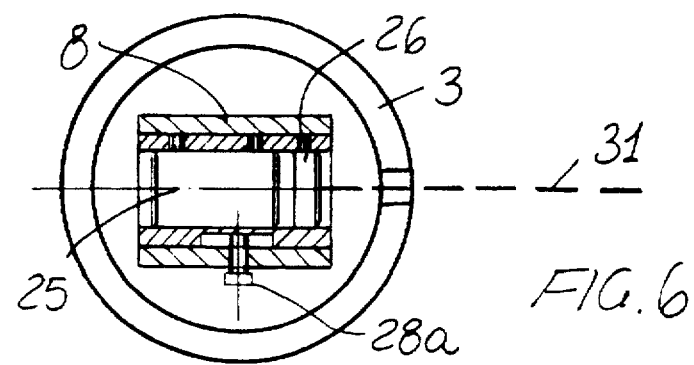
FIG. 6 is a schematic cross-sectional view of FIG. 5, substantially taken along the section line IV—IV.

As is clearly shown in FIG. 5, the projector 25 can be oriented inside the small block 27 so as to emit a diverging laser rays beam 31, the rays of which will lay in a vertical plane.

In this case, in order to obtain a perfectly vertical ray beam 31, it is necessary only a single adjustment operation, during the assembling stage, which is performed by operating on the screws 28a and 28b, so as to cause the sleeve 29 to turn about the rotary axis thereof, so as to provide, under a rest condition of the movable equipment 8, a projection of a ray beam on a perfectly vertical plane, even when the top portion 3 is turned about the axis 5.

According to the different embodiment shown in FIG. 7, the laser beam or ray projector 25, and its related optical assembly or lens 26, can also be arranged at the top end portion of the movable equipment 8, so as to provide a laser ray beam 32 laying on a vertical plane.

This vertical plane can be anyhow suitably oriented, by turning the top portion 3 about the axis 5.

Likewise, the orientation of the horizontal and vertical ray beam, as shown in FIGS. 1 and 5, can be changed by means of the rotation of the top portion 3 about the axis 5.

Figure 9:
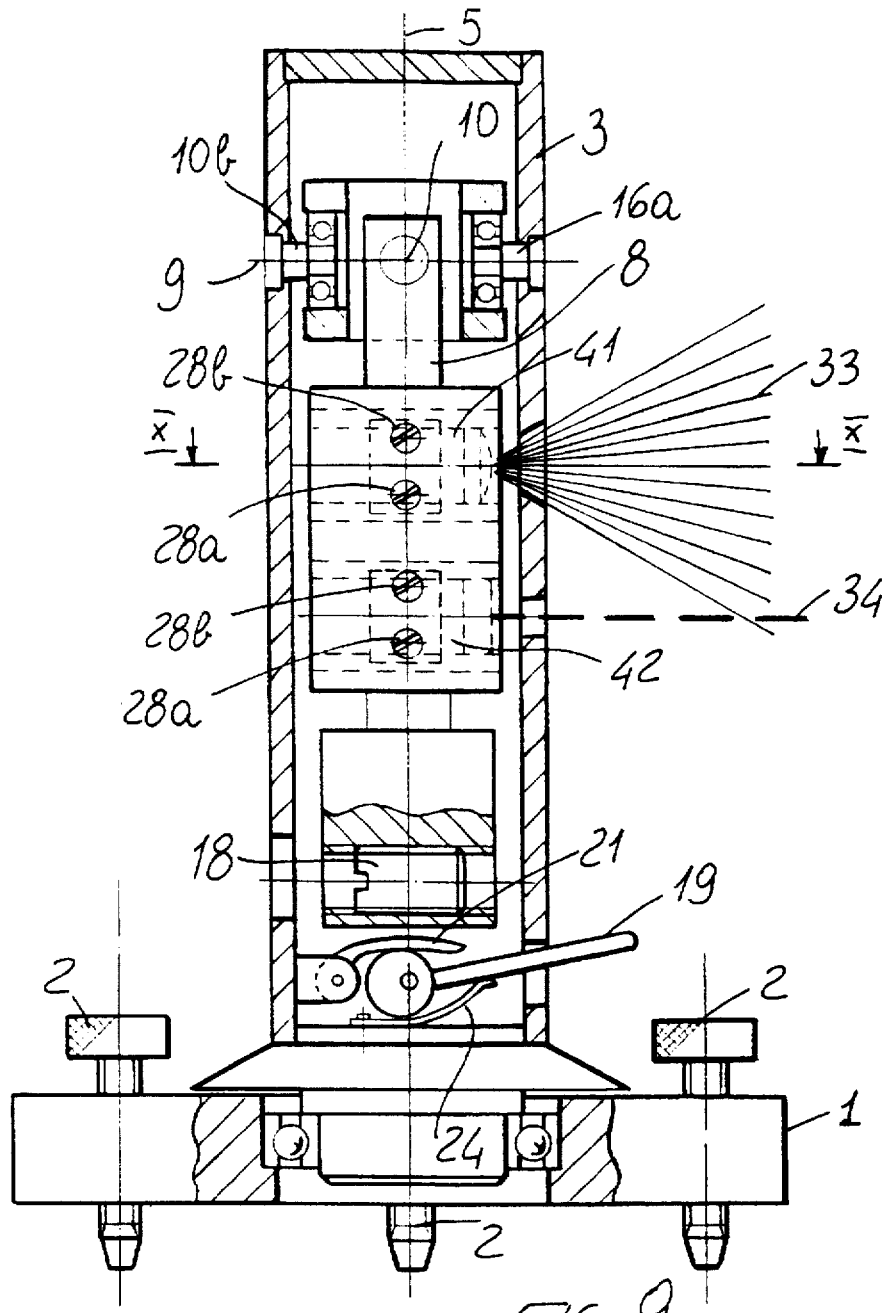
FIG. 9 illustrates another embodiment of the device according to the present invention, illustrated in an analogous manner to that of FIG. 1.
Figure 10:
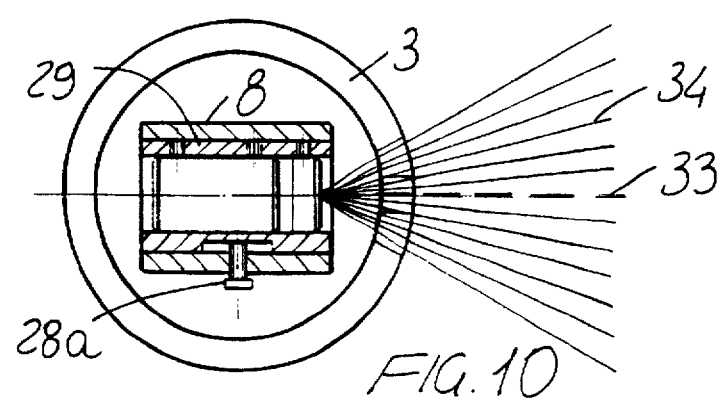
FIG. 10 is a schematic cross-sectional view of FIG. 9, substantially taken along the section line X—X.

According to the modified embodiment shown in FIG. 9, on the movable equipment 8 can also be mounted two projectors 41 and 42, provided with the related optical lenses or assemblies, so as to project two diverging ray beams, which respectively lay on a vertical plane and on a horizontal plane, thereby projecting, on a wall spaced apart from the device, a perfectly vertical straight line and a perfectly horizontal straight line which intersect mutually as a cross.

The arrangement of the projectors 41 and 42 and related lens assemblies can be calibrated, during the assembling stage of the projectors on the movable equipment 8, so as to provide perfectly horizontal and vertical ray beams.

More specifically, by operating the projector 42 adjusting screws 28a and 28b, the beam 34 is so oriented as not to cross the horizontal line, or any reference horizontal lines. The horizontal arrangement of the beam 34 is obtained by suitably arranging the adjustment dowel 19.

In order to make the projector 41 to generate a beam 33 laying on a vertical plane, it is sufficient to adjust the pair of screws 28a and 28b of said projector 41 so as to cause the beam 33 to pass through a plumb line.

The particular arrangement of the projectors 41 and 42 will allow to project on a wall, by using equal power laser emitters, a cross having substantially arms of the same length.

Figure 11:
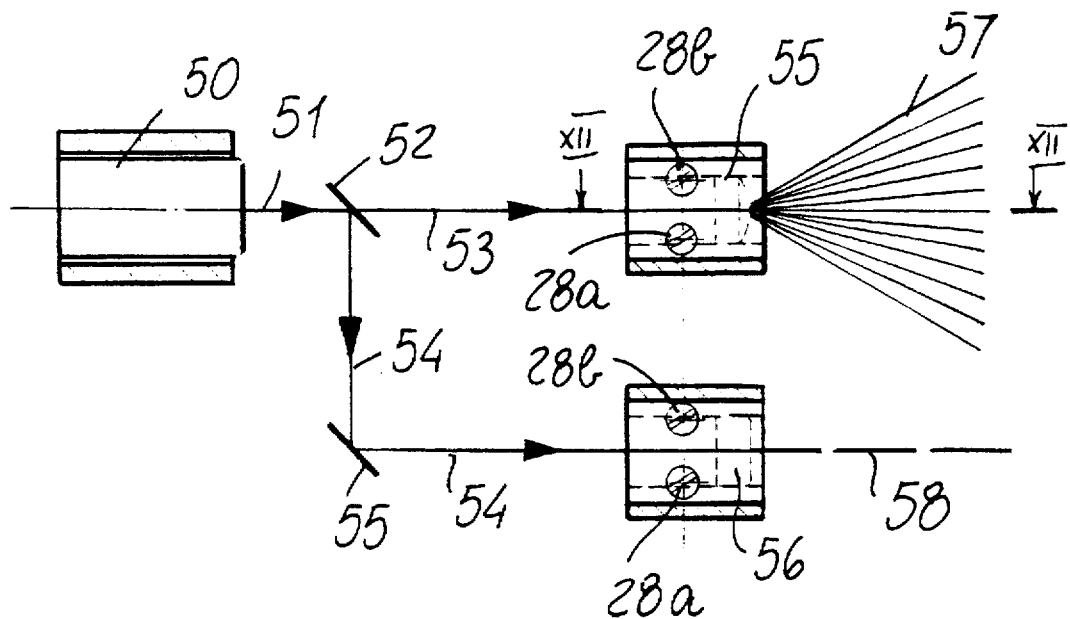
FIG. 11 illustrates a possible optical diagram of the device shown in FIG. 9.
Figure 12:
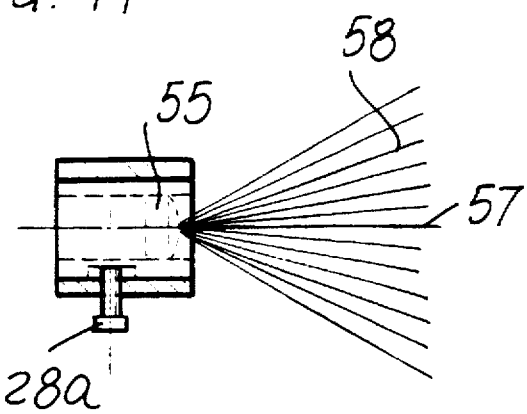
FIG. 12 schematically illustrates a detail of FIG. 11, by a cross-sectional view substantially taken along the section line XII—XII.

The two diverging ray beams, respectively horizontal and vertical, can also be generated by two mutually independent emitters, or, as is clearly shown in FIG. 11, they can be generated by a single emitter 50 emitting a laser ray 41 which, by an optical assembly constituted for example by a semireflecting mirror or prism, or pentaprism 52, will be split into two rays 53 and 54. As shown, along the path of the ray 54 is provided a further prism or pentaprism, or reflecting mirror 55, for deflecting the ray 54 so as to make it preferably parallel to the ray 53.

Along the path of the rays 53 and 54 are moreover provided optical assemblies or lenses 55 and 56 for transforming respectively the rays 53 and 54 into a vertical beam 57 of diverging flat laser rays and into a horizontal beam 58 of diverging flat laser rays, corresponding to the beams 33 and 34.

As clearly shown in FIG. 13, it is also possible to provide three projectors 61, 62, 63 with related optical assemblies or lenses, so as to respectively project a horizontal beam 64 of diverging laser rays, a beam 65 of diverging laser rays laying on a vertical plane and perpendicularly crossing the beam 64 of laser rays emitted by the projector 61, as well as a third beam 66 of laser rays also laying on a vertical plane but emitted on the top of the device.

Figure 16:
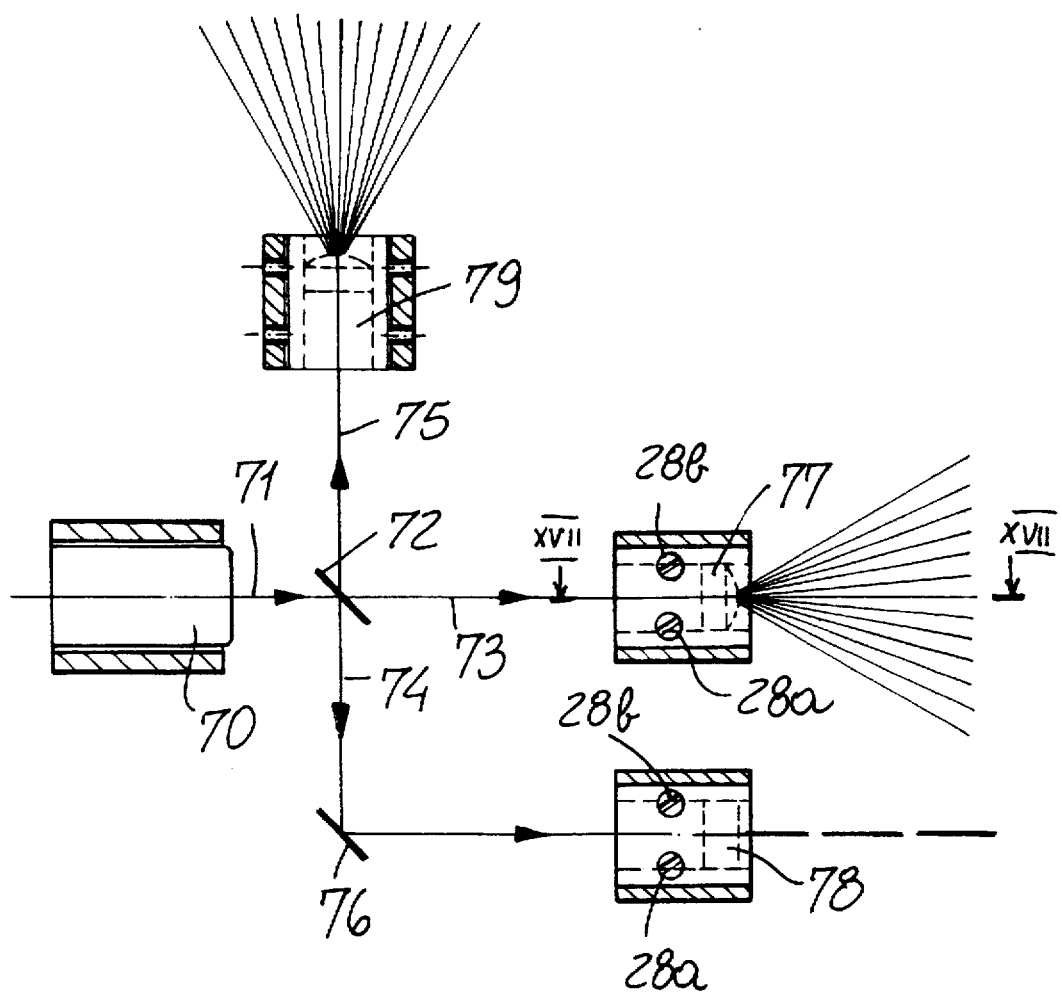
FIG. 16 illustrates a possible optical diagram of the device being shown in FIG. 13.
Figure 17:
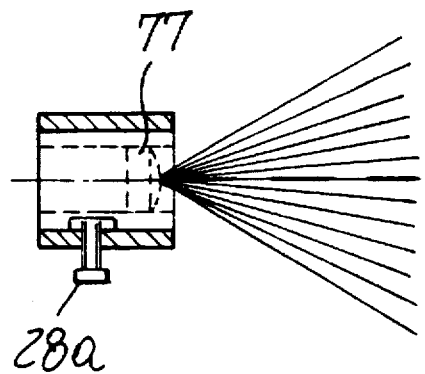
FIG. 17 is a further schematic cross-sectional view of FIG. 16, substantially taken along the section fine XVII—XVII.

Even in this case, the projectors and associated optical assemblies can be constituted by mutually independent emitters or, as shown in particular in FIG. 16, a single emitter 7G can be provided for emitting a laser ray 71, which, by means of an optical system constituted for example by a semi-reflecting mirror 72, or prism, or pentaprism, is split into three rays respectively indicated at 73, 74e and 75.

On the path of the ray 74 is, moreover, provided a reflecting mirror 76 or prism, or pentaprism, which deflects the ray 74, so as to bring it to a position substantially parallel to the ray 73.

Along the path of the so deflected ray 74, as well as along the path of the ray 73, there are arranged respective optical assemblies 77 and 78 which generate laser ray beams, respectively laying on a vertical and on a horizontal plane, and mutually cross-like intersecting.

Along the p at h of the beam 75, is further provided an additional optical assembly 79, or lens, which generates a flat beam of diverging laser rays laying on a substantially vertical plane.

Even in this case, the optical assemblies 77, 78, 79 can be calibrated, in a rotary manner and about their respective axes, by means of calibrating or adjustment screws, in an analogous manner to the above disclosure.

Figure 19:
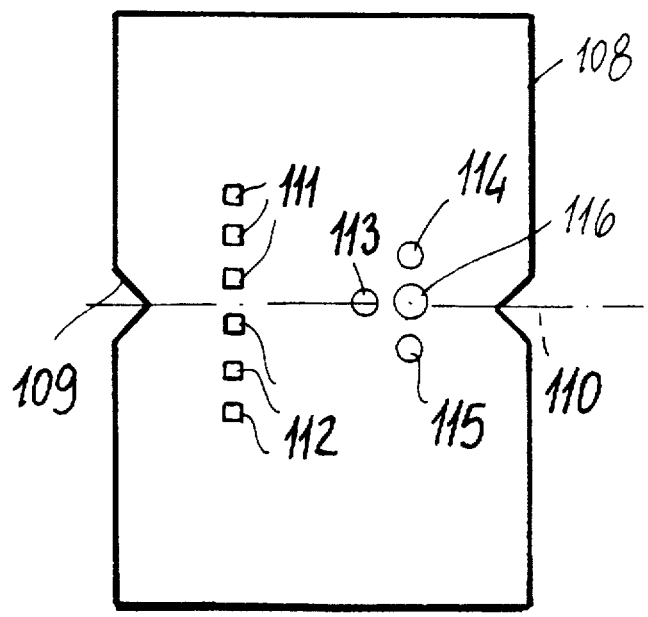
FIG. 19 illustrates a receiver device for receiving the rays or beams emitted by the laser diode or diodes included in the device according to the present invention.

As laser ray or beam emitters having a wave length within the not visible radiation range are used, there is provided on the wall or the surface, thereon the diverging laser rays or beams are impacted, a suitably receiver of the type shown in FIG. 19, sensitive to the variations of the light power impacting on it, and capable of signaling either in an acoustic or in a luminous manner when the intercepted diverging ray flat beam is parallel to or coincides with a fixed preset line on said receiver.

In this case, the not visible laser rays emitted must be of a pulsating nature.

Figure 18:
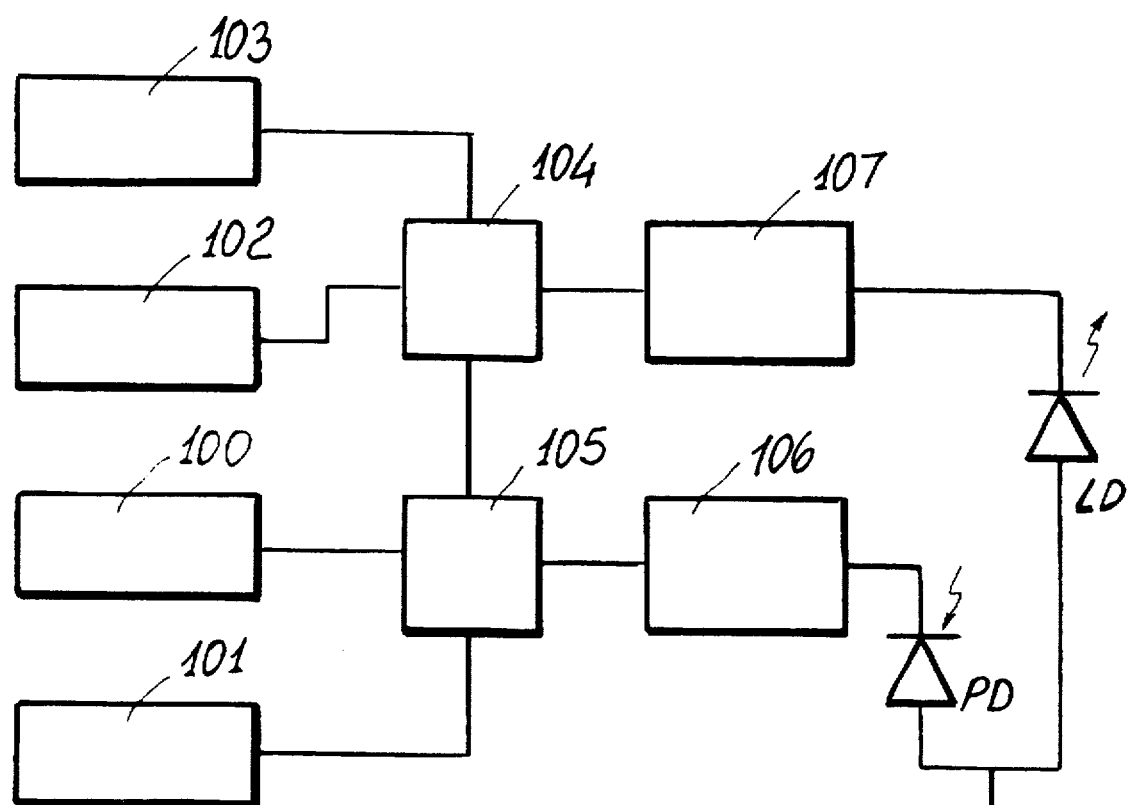
FIG. 18 illustrates a block diagram of an electronic circuit for generating pulsating laser beams or rays of the device according to the present invention.

Such a pulsation can be generated, for example, by an electronic circuit connected between the laser diode LD and the power supply as it is shown in the diagram of FIG. 18.

This diagram comprises: an electric power supply 100 (bias level) for the control and energizing system of the laser diode LD, a reference circuit 101 (bias calibration) for controlling the power to be applied to the laser diode LD, a circuit 102 (oscillator) for generating a square wave carrier frequency, and a circuit 103 (modulator) for generating code pulses on the carrier frequency (square wave pulse bursts).

The oscillator 102 and modulator 103 drive an electric switch 104 (writer) for power supplying the laser diode LD. The switch 104, in particular, is supplied by a control knot of the feedback type 105 for the current to be supplied to the laser diode LD through the writer 104, depending on the power supply voltage and on the reference electric parameters and the light power emitted by the laser diode LD.

The feedback arrangement 105 is coupled at the input to the bias level 100, to the bias calibration 101 and to a feedback amplifier 106, constituted by a detection circuit for detecting the light power of the laser diode LD by a photodiode PD generating an electric signal depending on the light emitted by the laser diode LD, and at the output to the writer 104.

The writer 104 supplies the laser diode LD through an LD output driver 107, which is a typical circuit for igniting the laser diode LD.

The receiver shown in FIG. 19 comprises a supporting plate 108, provided laterally with reference notches 109 at a preset reference line 110 arranged at the center of the two sensor assemblies 111 and 112. The receiver further comprises a sound emitting device 113 or a light emitting device 116 for emitting either an acoustic signal or a light signal actuated as the laser beam impacts simultaneously and with the same intensity the sensor 111 and 112, thereby providing a continuous sound and/or the energizing of sensor 116.

If, on the contrary, the laser beam impacts with a greater intensity one of the two sensor assemblies 111 or 112, then the acoustic signal will be an intermittent signal and the light signal will be energized exclusively in the sensor 114 or 115, respectively.

The possibility of interposing between the laser diode and the power supply source thereof an electronic circuit suitable to transform, if desired through a switch, flat beams of visible laser rays from continuous to pulsating, allows the device to meet all of the possible use requirements, since it can operate both in an inside environment as a self-leveling projector of continuous horizontal and vertical segments (i.e. visible for the human eye) and an outside environment where the sensitive receiver will allow to localize the pulsating planes of horizontal and vertical laser rays which are not visible for the human eye.

In the embodiments using several laser ray emitters, such as, for example, the embodiment shown in FIGS. 9 and 13, it is possible to provide for several switches for switching off one or more of said emitters as their use is no longer required.

For completeness of description it is underlined that the elements which are shared in the several above discussed embodiments have been referenced, in the drawing figures, by the same reference number.

From the above disclosure and from observations of the figures of the accompanying drawings, it should be apparent that the invention fully achieves the intended aim and objects.

Moreover, it should be pointed out that a fully range of 360° of rotation self-leveling device has been provided, which allows to project one or more flat beams, of diverging laser rays, visible or not visible, either continuous or pulsating, laying on a horizontal plane and/or on a vertical plane, with the possibility of changing the orientation of said ray beams about a vertical axis, thereby allowing a single operator, even unskilled, to perform, in a simple and quick manner, a tracing of perfectly and even simultaneous horizontal and/or vertical reference segments, possibly crossing perpendicularly on a wall, or on a surface on which said beams are projected and without the need of providing a perfectly horizontal bearing surface and of the rotation of said laser beam about a vertical or horizontal axis, but simply providing a horizontal and/or vertical diverging flat laser beam which, depending on requirements, can be continuous and visible (particularly suitable in an indoor environment) or pulsating, either visible or not visible (suitable in an outdoor environment or for great distances) by using a sensitive suitable receiver.

While the invention has been disclosed and illustrated with reference to preferred embodiments, it should be apparent that such disclosed embodiments are susceptible to several modifications and variations, all of which will come within the spirit and scope of the invention, as defined in the accompanying claims.

I claim:

1. A self-leveling by gravity projector device for projecting at least one laser light beam of flat diverging rays for respectively tracing on targeted walls or bodies at least one horizontal and at least one of vertical line, comprising in combination: a base element (1) provided with bearing feet (2) and a hollow top portion (3) supported by the said base (1); said hollow top portion (3) supports a self-leveling movable equipment (8), swingable about two horizontal axes (9) and (10) by means of gimbals (11, 12, 13, 14, 15, 16a, 16b), thereon it is arranged at least a projector of laser beams; means (19, 20, 24) for damping the swinging of said movable equipment (8); said projector is provided with an optical assembly for transforming the laser beam into a beam of coplanar divergent rays, said bearing feet (2) being means for initial setting on a bearing base of the height of said projector device wherein the hollow portion (3) is rotatable about a vertical axis (5) with respect to the supporting base (1) by means of a bearing (4), and is provided near the bottom portion thereof with a plurality of notches (6), said notches (6) are marked by an index (7) for the accurate rotation of said hollow top portion (3) in respect to said base element (1), said bearings (4) and gimbals (11, 12, 13, 14, 15, 16a, 16b) maintaining the self-leveling of said movable equipment (8) during said rotation.

2. Device according to claim 1, wherein the movable equipment (8) is provided, near the bottom end portion thereof, with a threaded recess (17) whose axis is horizontal, therein a dowel (18) is displaceable in and out, said dowel (18) constituting a means for changing the position of the center of mass of said movable equipment (8).

3. Device according to claim 1, wherein the optical assembly (26) of the projector (25) is supported by a sleeve (29) and provided with screws (28a, 28b), said screws (28a, 28b) allowing the rotation of said sleeve (29) about its axis, said rotation providing for the angular alignment of beam (30) with reference to the line of horizon and at least to one of any horizontal reference line.

4. Device according to claim 1 wherein the movable equipment (8) is provided with two projectors (41, 42), said projectors emitting, respectively, a first and a second diverging flat laser beam, said first beam lying on an horizontal plane and said second beam lying on a vertical plane in order to crosswise intersect.

5. Device according to claim 1, wherein the movable equipment (8) is provided with a projector (50) emitting a laser beam (41), said laser beam (41) being split by a pentaprism (52) in two beams (53,54), said beams (53,54) made parallel by means of mirror (55); and optical assemblies (55,56) for transforming said beams (53,54) in a first beam (57) of diverging vertical rays and a second beam (58) of diverging horizontal laser rays.

6. Device according to claims 1, wherein the movable equipment (8) is provided with first (61), second (62) and third (63) laser projector, respectively associated to first, second and third optical assembly, said first (61) projector emitting, trough said first optical assembly, a first flat diverging horizontal beam (64), said second (62) projector emitting, through said second optical assembly, a second flat diverging vertical beam (65), said second flat diverging vertical beam (65) crossing perpendicularly said first flat diverging horizontal beam (64); said third (63) projector emitting a third flat diverging vertical beam (66) in the direction of the axis of the movable equipment (8).

7. Device according to claims 5 or 6 wherein the laser diode source emits in the visible range.

8. Device according to claim 5 or 6 wherein the laser diode source emits in the invisible range.

9. Device according to claim 1 wherein the projector contains a continues wave laser diode source.

10. Device according to claim 1 wherein the projector contains a pulsating wave laser diode source.

11. Device according to claim 1 wherein that the projectors are provided with switches for remote control of the laser diode sources in order to switch on and off each of the emitted beams.

12. Device according to claim 11 wherein the switch for remote control of the laser diode source comprises an electronic power supply (100) and a reference circuit (101), for controlling the electric power to be applied to said laser sources LD, coupled to an input of a feedback control arrangement (105) which is connected, at an other input thereof, through a signal amplifier (106) to a photodiode generating an electric signal proportional to the light power emitted by said laser diode, said feedback control arrangement (105) connected, through an output thereof, to an electronic switch (104) controlled by an oscillator (102) and a modulator (103), said electronic switches (104) supplying said laser diode by means of an igniting circuit (107).

13. In combination, a device according to claim 1 and an optical receiver device allocable on walls targeted by the emitted diverging flat laser beam, consisting of a supporting plate (108) provided laterally with reference notches (109) at a preset reference line (110) and placed at the center of two groups of sensors (111) and (112), said sensors (111, 112) being suitable to detect light power variation; of a sound emitting device (113) and of light emitting devices (114, 115, 116), wherein sensors (111, 112) drive continuos sound device (113) and at least one of continuos light device (116) for intercepted diverging flat laser beam parallel or coincident with said preset line (110), whereby sensors (111, 112) drive intermittent sound device (113) and first (114) or second (115) continuos light device for misalignment of intercepted diverging flat laser beam, said misalignment being, respectively, towards sensors (111) or sensors (112).

14. Device according to claims 1 wherein the optical assembly consists of a laser bearing bushing (206), thereon a cylindrical lens bearing bushing (204) is mounted, said cylindrical lens bushing (204) being provided with position affixing dowels (205) and supporting the half-cylindrical lens (207), said half-cylindrical lens (207) being set at position by dowels (209) and fixed by dowel (208), therein said bushing (206) holds a body (203) housing the half-spherical lens (202), said lens (202) being held in position by ring nut (210) and aligned with body (203), therein a laser diode assembly (201) is locked by threaded ring nut (215).

15. Device according to claim 14 wherein the laser bearing bushing (206) is turnable inside the lens bearing bushing (204) and lockable by means of screws (205) in the desired position for setting the alignment of the flat beam, whereas the adjustment of the half-cylindrical lens by means of screw (209) provides for a rectilinear flat beam.

* * * * *